US009305219B2

(12) United States Patent
Ramalingam et al.

(10) Patent No.: US 9,305,219 B2
(45) Date of Patent: Apr. 5, 2016

(54) METHOD FOR ESTIMATING FREE SPACE USING A CAMERA SYSTEM

(71) Applicant: Mitsubishi Electric Research Laboratories, Inc., Cambridge, MA (US)

(72) Inventors: Srikumar Ramalingam, Cambridge, MA (US); Jian Yao, Toronto (CA); Yuichi Taguchi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 143 days.

(21) Appl. No.: 14/162,370

(22) Filed: Jan. 23, 2014

(65) Prior Publication Data

US 2015/0206015 A1  Jul. 23, 2015

(51) Int. Cl.
| G06K 9/00 | (2006.01) |
| G06T 11/20 | (2006.01) |
| G06T 11/60 | (2006.01) |
| G06K 9/62 | (2006.01) |

(52) U.S. Cl.
CPC .......... *G06K 9/00791* (2013.01); *G06K 9/6262* (2013.01); *G06K 9/6297* (2013.01); *G06T 11/206* (2013.01); *G06T 11/60* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS

| 6,356,664 | B1 * | 3/2002 | Dunn et al. | 382/239 |
| 7,539,557 | B2 | 5/2009 | Yamauchi | |
| 8,195,394 | B1 | 6/2012 | Zhu et al. | |
| 8,548,220 | B2 | 10/2013 | Bang et al. | |
| 2002/0080235 | A1 * | 6/2002 | Jeon | 348/116 |
| 2006/0279585 | A1 * | 12/2006 | Milanfar et al. | 345/694 |
| 2009/0074275 | A1 * | 3/2009 | O Ruanaidh | 382/128 |
| 2010/0121577 | A1 * | 5/2010 | Zhang et al. | 701/301 |
| 2010/0201682 | A1 * | 8/2010 | Quan et al. | 345/419 |
| 2011/0025841 | A1 * | 2/2011 | Cunningham et al. | 348/135 |
| 2013/0077850 | A1 * | 3/2013 | Hirai et al. | 382/149 |
| 2013/0128034 | A1 * | 5/2013 | Carr | 348/135 |
| 2013/0222589 | A1 * | 8/2013 | Lalonde et al. | 348/148 |
| 2014/0071240 | A1 * | 3/2014 | Chen et al. | 348/46 |

OTHER PUBLICATIONS

Plagemann, Christian, et al. "A nonparametric learning approach to range sensing from omnidirectional vision." Robotics and Autonomous Systems 58.6 (2010): 762-772.*

Veksler, Olga. "Graph cut based optimization for MRFs with truncated convex priors." Computer Vision and Pattern Recognition, 2007. CVPR'07. IEEE Conference on. IEEE, 2007.*

(Continued)

*Primary Examiner* — Stephen R Koziol
*Assistant Examiner* — Sean Connor
(74) *Attorney, Agent, or Firm* — Dirk Brinkman; Gene Vinokur (57) ABSTRACT

A method estimates free space near a moving object from a sequence of images in a video acquired of a scene by a camera system arranged on the moving object by first constructing a one-dimensional graph, wherein each node corresponds to a column of pixels in the image. Features are determined in the image, and an energy function is constructed on the graph based on the features. Using dynamic programming, the energy function is maximized to obtain the free space.

21 Claims, 4 Drawing Sheets

(56) References Cited

OTHER PUBLICATIONS

Vernaza, Paul, Ben Taskar, and Daniel D. Lee. "Online, self-supervised terrain classification via discriminatively trained submodular Markov random fields." Robotics and Automation, 2008. ICRA 2008. IEEE International Conference on. IEEE, 2008.*

Wellington, Carl, Aaron C. Courville, and Anthony Stentz. "Interacting Markov Random Fields for Simultaneous Terrain Modeling and Obstacle Detection." Robotics: Science and Systems. 2005.*

Zelinsky, Alexander, et al. "Planning paths of complete coverage of an unstructured environment by a mobile robot." Proceedings of international conference on advanced robotics. vol. 13. 1993.*

Larson, Jacoby, et al. Advances in autonomous obstacle avoidance for unmanned surface vehicles. Space and Naval Warfare Systems Center San Diego CA, 2007.*

H. Badino, L.I. Franke, and D. Pfeiffer. The stixel world -a compact medium level representation of the 3d-world. 31st DAGM Symposium on Pattern Recognition, 2009.

D. Hoiem, A. A. Efros, and M. Hebert. Automatic photo pop-up. ACM Trans. Graph., 2005.

* cited by examiner

METHOD FOR ESTIMATING FREE SPACE USING A CAMERA SYSTEM

FIELD OF THE INVENTION

This invention relates generally to free space estimation, and more particularly to estimating the free space from images acquired by a camera system.

BACKGROUND OF THE INVENTION

In the field of autonomous navigation and computer vision, free space is defined as an area in front of a moving object, e.g., in front of or behind a vehicle, boat, or robot, where the object can manoeuvre without colliding with other objects. Another name for the free space is drivable space.

With the use of accurate maps and localization systems, autonomous navigation provides incremental navigation directions to the moving object to travel from point A to point B without colliding on any obstacles along its path. To do this, it is necessary to know critical information that is necessary to avoid obstacles, and a most cost-effective approach to obtain the critical information.

The most critical information for the autonomous navigation is the free space. It is well-known that the free space can be estimated using stereo cameras. For example, it is possible to estimate a ground plane and obstacles above the ground plane using a stereo camera system. The concept of occupancy grids is closely related to free space estimation. An occupancy grid refers to a two-dimensional (2D) grid where every cell models the occupancy evidence of the environment, and is typically estimated using a three-dimensional (3D) sensor that measures distances on a planar slice of the environment, such as a scanning LIDAR and an array of ultrasound sensors.

A stixel world representation has been used for the free space estimation problem. The stixel world refers to a simplified model of the world using a ground plane and a set of vertical sticks on the ground representing the obstacles. The model can compactly represent an image using two curves, where a first curve runs on the ground plane enclosing a largest free space in front of the camera and a second curve indicates the height (vertical coordinates) of all the vertical obstacles at a boundary of the free space. The stixel world can be determined using depth maps obtained from stereo cameras. There are several algorithms that determine the depth maps from stereo images, such as semi-global stereo matching method (SUM). Stixels can be also determined without explicitly estimating the depth maps from stereo images using dynamic programming (DP). Those techniques either implicitly or explicitly determine depth using a stereoscopic or 3D sensor.

To reduce the system complexity and cost, it is desired to determine the free space from a sequence of images, i.e., a video, acquired by a monocular camera mounted on the moving object. There are several challenges in solving this problem using monocular videos instead of stereo videos. In contrast to other segmentation problems, it is not possible to rely completely on color or edges. For example, in videos of roads, strong gradients from cross-walks and lane markings are often present. In the case of water, there is often reflection from nearby boats, buildings, or sky. Features based on homography, that relies on planar roads, may not be accurate due to non-flat roads. Furthermore, the moving objects have additional challenges in monocular free space estimation.

It is known how to perform geometric layout estimation from single images. It is possible to classify the pixels in a given image into ground, buildings, and sky. This classification has been used to obtain popup 3D models of buildings. A scene can be modeled using two horizontal curves that partition an image into top, middle, and bottom regions. It is shown that this problem of segmenting an image into regions can be done using a globally optimum method.

The general idea of using dynamic programming for column-wise matching has been used for estimating the 3D models of buildings, and generalized to work with several layers of height-maps for modeling urban scenes.

Monocular videos have been used by simultaneous localization and mapping (SLAM) methods. Most of those methods provide a sparse point cloud and do not explicitly estimate the free space, which is the most critical information for autonomous navigation.

To the best of our knowledge, we are not aware of any free space estimation method for boats in the water using prior art computer vision techniques. The segmentation of water in an image of a scene is particularly challenging due to its specular properties, such as the reflection of nearby obstacles or sky on the water. Features such as color and edges perform poorly under such cases.

SUMMARY OF THE INVENTION

The embodiments of the invention provide a method for estimating free space near moving objects from a video, i.e., a sequence of images, acquired of a scene by a monocular camera. The method can be used for autonomous navigation of on-road vehicles and in-water boats. The method uses dynamic programming (DP) to segment the images acquired in front of or behind the moving objects into free space and obstacles.

In contrast to prior approaches using stereoscopic or 3D sensors, we make it possible to solve this problem using a video acquired by a monocular camera. Our method relies on several image and geometric features, such as the appearance of water and road, edge information, homographies between consecutive images, and smoothness. The features are used to determine a set of potentials for an objective or energy function.

We formulate the free space estimation problem as an optimization problem in a Markov random field (MRF). We define the MRF as a one-dimensional (1D) graph, where each node corresponds to a column of pixels in the image. As our graph forms a 1D chain, exact inference can be done using DR Parameters of an energy function of the MRF can be manually set, or automatically determined from a sequence of training images using a structured support vector machine (SVM).

Our method estimates the free space reliably, while only employing monocular cues. Our method can also incorporate other monocular cues, such as optical flow determined from the monocular video, and depth maps determined by estimating the motion of the camera and using multiple frames in the monocular video as multiple images. Although our main focus is on monocular camera systems, if stereo or multiple cameras are available, then we can also incorporate stereo or multi-camera cues, such as depth maps determined from the multiple cameras.

We are interested in scenes with challenging traffic conditions rather than buildings, and also maritime scenes. Furthermore, we obtain the free space segmentation that varies smoothly across a video sequence.

DETAILED DESCRIPTION OF THE PREFERRED EMBODIMENTS

Figure 1A:
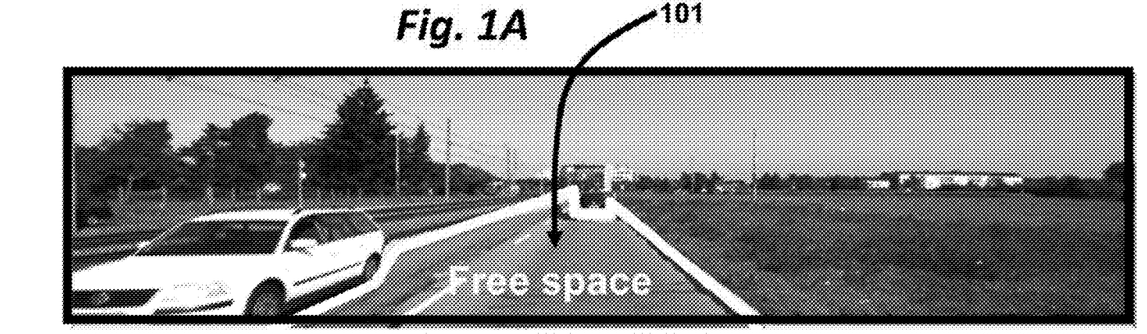
FIGS. 1A and 1B are images of a scene where free spaces are determined according to embodiments of the invention.
Figure 1B:
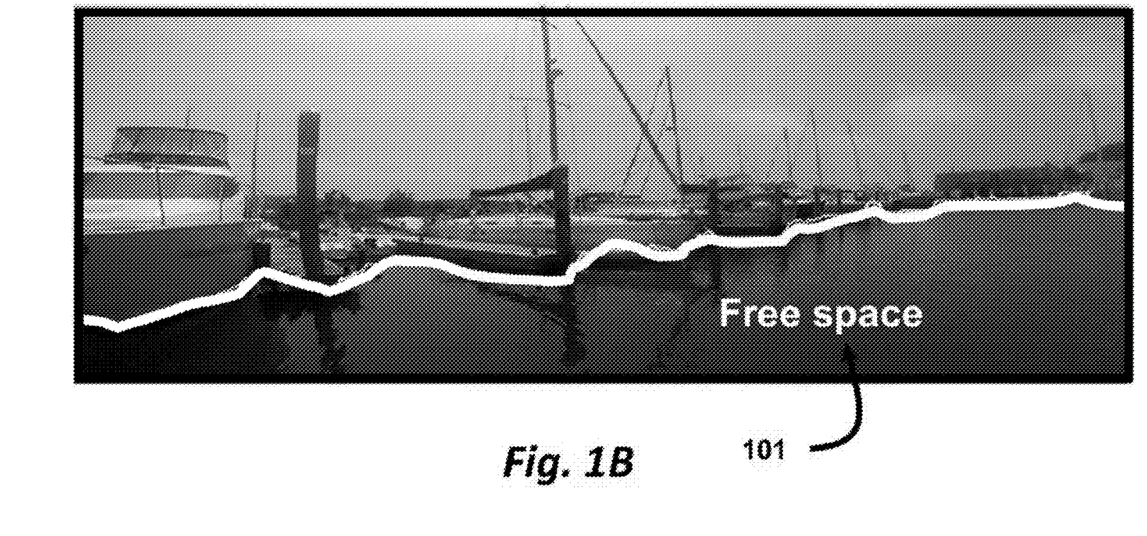
Figure 2A:
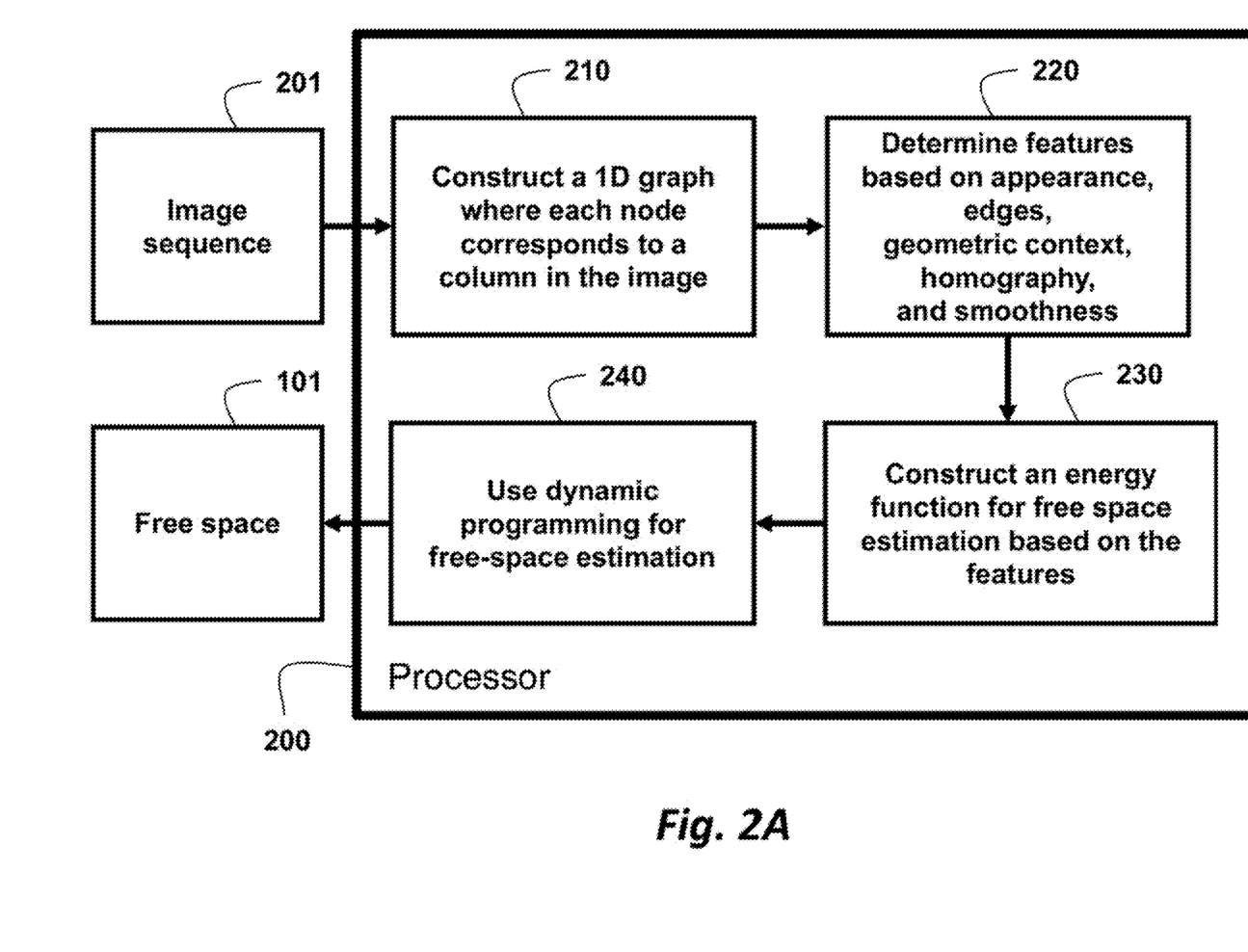
FIG. 2A is a flow diagram of a method for estimating free spaces according to embodiments of the invention.

As shown in FIG. 2A, the embodiments of our invention provide a method for estimating free space 101 near a moving object from a sequence of images 201 acquired of a scene by a camera system arranged on the moving object. Example images acquired from an on-road vehicle and an in-water boat with their corresponding free spaces are shown in FIGS. 1A and 1B, respectively. The camera system can be a monocular video system, or a stereo or multi-camera system.

The free space as determined by the embodiments of the invention can be used in a number of applications, such as autonomous navigation of vehicles moving from one location to another, manouvering a boat during berthing or mooring, parking a vehicle, and moving a robot such as an automated vacuum cleaner.

Figure 3:
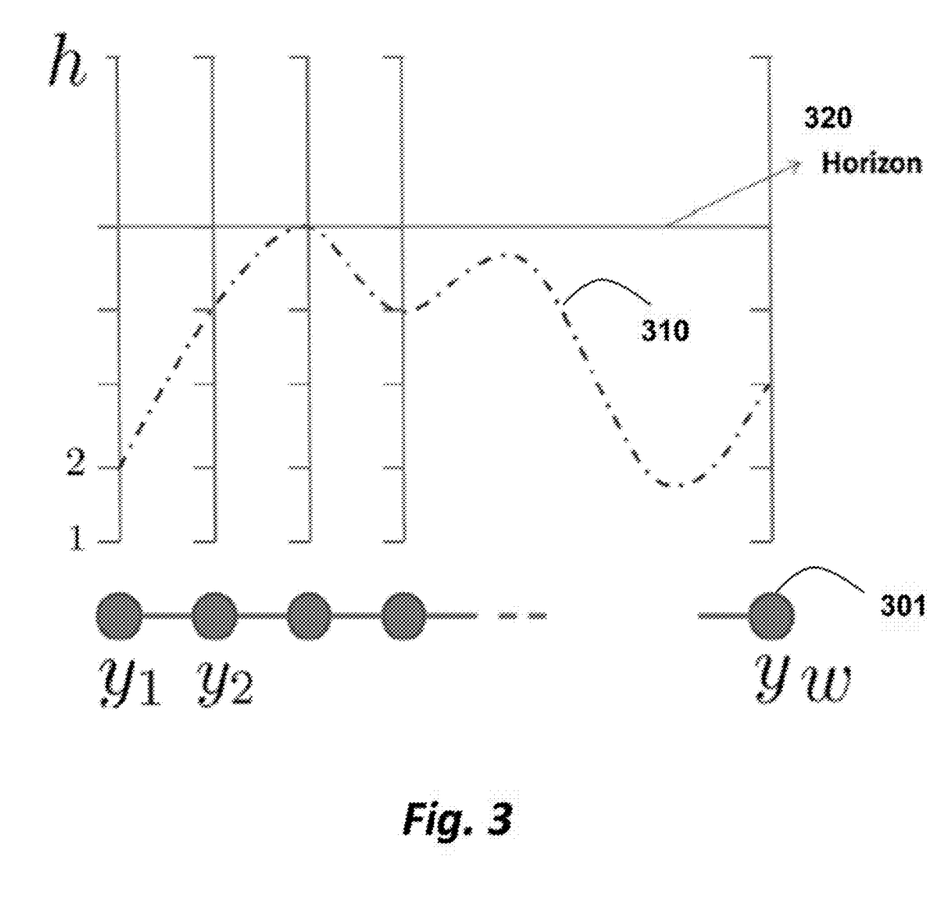
FIG. 3 is a one-dimensional graph used for determining the free space and a curve corresponding to the free space according to embodiments of the invention.

First, we construct 210 a 1D graph 301, see FIG. 3, where each node corresponds to a column of pixels in the image, and each edge connects neighboring columns. Then, we determine 220 features from the image based on edges, appearance, homography, geometric context, and smoothness, which we use to construct 230 an energy function, based on the graph, for the free space estimation. The features can also be based on the optical flow in the images, or a depth map determined, from a monocular video sequences. Then, we use 240 dynamic programming for estimating the free space 101 by maximizing the energy function.

Figure 2B:
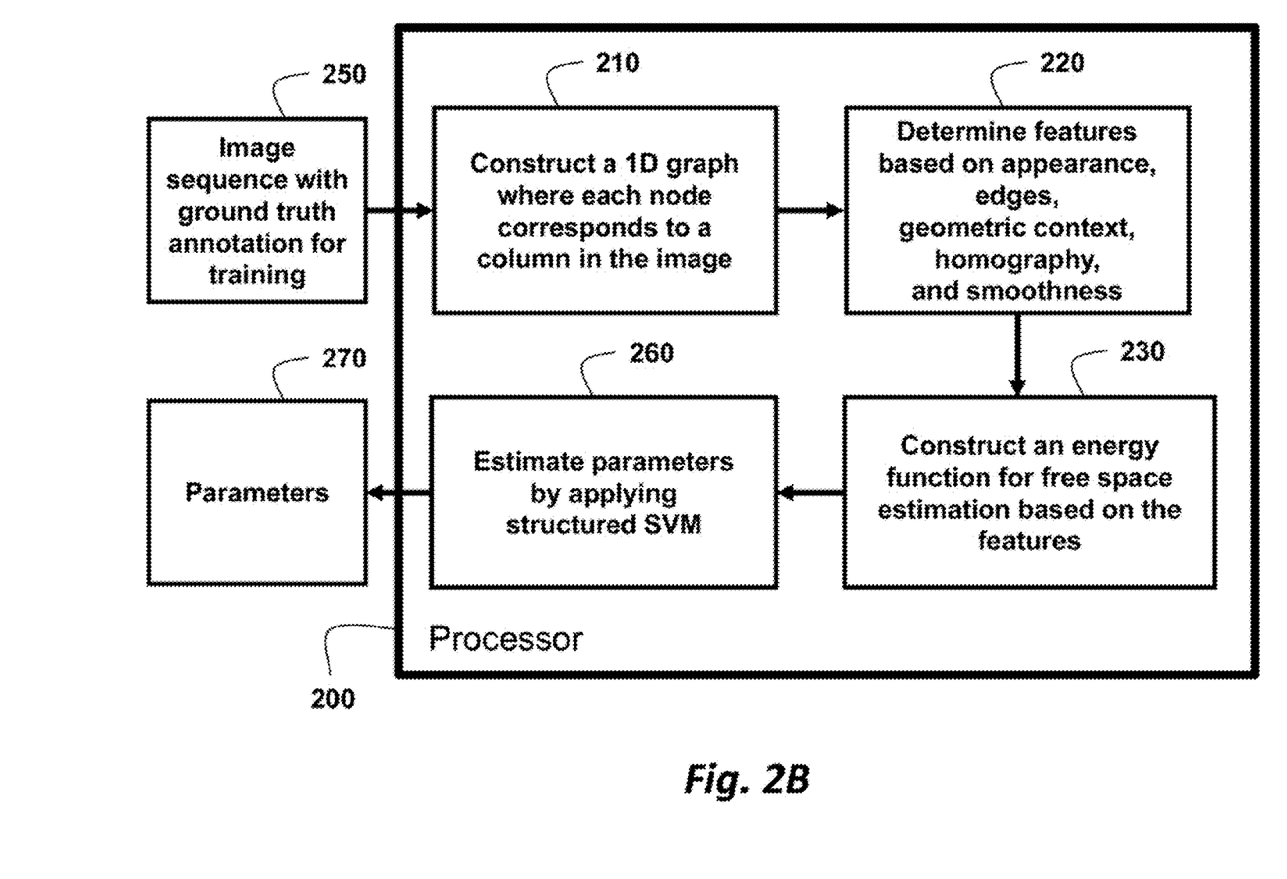
FIG. 2B is a flow diagram of a method for determining parameters of an energy function according, to embodiments of the invention.

The energy function is defined as a sum of potential functions determined by the features with their corresponding weight parameters. The weight parameters can be manually set, or automatically determined from a sequence of training images having ground truth annotations 250 by using a learning algorithm, as shown in FIG. 2B. For learning the parameters, we first use the sequence of training images 250 to construct 210 the 1D graph, determine 220 the features, and construct 230 the energy function. We then estimate 260 the weight parameters 270 using a structured SVM. The steps of the method can be performed in a processor 200 connected to memory and input/output interfaces by buses as known in the art.

Monocular Free Space Estimation

Specifically, as shown in FIG. 1, we are interested in estimating the free space given monocular imagery in the context of both marine and urban navigation. Towards this goal, we express the problem as the one of inference in a Markov random field (MRF), which estimates for each image column $y_i$ of pixels, the vertical coordinates of an obstacle. The MRF is represented as a 1D graph 301, and the solution provides a 1D curve 310 in the image, as shown in FIG. 3.

The 1D graph 301 includes a set of nodes denoted by $y_i$ corresponding to the w columns of the image. Each node represents a discrete variable whose value comes from a set of labels given by the h rows in the image. The labels are ordered such that the bottom pixel has a label 1, and the top pixel has it label h. By solving the energy maximization problem on the graph and labeling these nodes, we obtain the 1D curve 310. An area under the curve defines the free space 101 near the vehicle or boat. The 1D curve can be used for estimating the nearby free space in front of, or perhaps behind, vehicles, robots, and boats.

Below, we provide details on the energy function, potentials, inference, and parameter learning.

Energy Function

Let $I_t$ denote the image at time t in the video. The dimensions of the image are w×h, where w and h are the width and height respectively. We model the problem so that we have w discrete variables $y_i, i \in \{1, \ldots, w\}$ and each variable can take a value from h discrete labels, $y_i \in \{1, \ldots, h\}$.

Let us consider the 1D graph 301. G={V,E}, where vertices are V={1, ... w}, and the edges are $(i,i+1) \in E, i \in \{1, \ldots, w-1\}$. We can further restrict the states of $y_i$ to never be above the horizon 320, which is always above the ground plane. We can determine an estimate of the horizon manually based on the configuration of the camera system (e.g., position and field of view of the camera), or automatically using the set of training images, and use the estimate to restrict labels in an inference procedure. Hence, the estimate of the horizon can be used to restrict: vertical coordinates of obstacles in the scene.

To determine the curve 310 for image $I_t$, we also use features from image $I_{t-1}$. Our energy function E is $$E(y, I_t, I_{t-1}) = w^T \phi(y, I_t, I_{t-1}), \quad (1)$$

where T is a transpose operator, $y=(y_1, \ldots, y_w)$, and potentials $\phi$ of the energy function decompose into unary and pairwise terms:

$$E(y, I_t, I_{t-1}) = \underbrace{\sum_{u \in U} \sum_i w_u \phi_u(y_i)}_{unary} \underbrace{\sum_{(i,j) \in E} w_p \phi_p(y_i, y_j)}_{pairwise}. \quad (2)$$

The unary potentials are $\phi_u(y_i)$, and the pairwise potentials are $\phi_p(y_i, y_j)$. The weight parameters of the unary and pairwise terms are $w_u$ and $w_p$, respectively. The weight parameters can be formed as $w=\{w_u, w_p\}$, which are set manually or learned from the set of training images using structure prediction techniques. Here, $$U=\{appearance, edge, homography, geometric\_context\}, \quad (3)$$

refers to the set of unary potentials, which are now described in greater detail.

Appearance

We use two Gaussian mixture models (GMMs), each with five components, to model the appearance model of road or water, and background. Herein, the terms road and water can be used interchangeably. The GMMs are used to determine the probability for each pixel to be road or water, or background. The GMMs that are specific to target scenes can be determined from the training images with the ground truth annotations 250 using an expectation-maximization (EM) method. The GMMs can be also determined, for more general scenes by using images including road/water and background with ground truth annotations.

Our goal is to estimate the free space so that the curve lies on the boundary between road and non-road (or water and obstacles). Towards this goal, we derive a potential that considers the entropy of the distribution in patches around the labels as follows:

$$\phi_{appearance}(y_i = k) = H(i, k) \sum_{j=k}^{h} H(i, j), \quad (4)$$

where the entropy $H(i, j)$ is determined in terms of the distribution of road/non-road (or water/non-water) pixels in a patch centered at each pixel location $(i, j)$. The entropy $H(i, j)$ should be high near the boundary between road/non-road pixels. Because the curve passes through the boundary between the closest set of obstacles and the road, we use a cumulative sum that attains a maximum for the curve that passes through the bottom of the image. The function also ensures that the curve passes through a pixel that has a non-zero $H(i, k)$ value. This estimate can be quite noisy.

To smooth the curve, we determine a location prior probability, which expresses, for each pixel, the probability of being road, which is estimated by determining empirical counts of the road pixels below the curve from the training data. We then determine the pixels which in all images are road, and force their entropy to be zero. This is a conservative estimate, but nonetheless it smooths the results considerably.

Edge

The ground truth curve is at the boundary between the ground plane and the obstacles. We derive an edge potential, which encodes the fact that we prefer the curve to be aligned with contours. There may be many contours in the image, however, the curve prefers edges that are located near the bottom of the image, which would correspond to closest edges in the 3D space of the scene. To take this into account, we define the following potential, which accumulates edge evidence as follows:

$$\phi_{edge}(y_i = k) = e(i, k) \sum_{j=k}^{h} e(i, j), \quad (5)$$

with $e(i, j) = 1$ when there is an edge at the $(i, j)$ pixel, and zero otherwise.

Geometric Context

Given a single image, it is possible to classify the pixels in the image to ground, buildings (horizontally oriented), and sky. Let $G(i, j)$ refer to a Boolean label corresponding to whether a pixel is ground, or not, based on this classification. Because we are interested in getting the curve that encloses the largest free space, we use the following potential:

$$\phi_{gc}(y_i = k) = \frac{1}{k}\sum_{j=1}^{k} G(i, j) - \frac{1}{h-k}\sum_{j=k+1}^{h} G(i, j). \quad (6)$$

Homography

It is important to obtain a free space that is smooth across the image sequence. One possibility is to estimate the curves in two consecutive images jointly by considering pairwise connections between nodes in one image to the nodes in a previous image. This would result in constraining the labeling of a pixel $p(i, j)$ in image $I_t$ with neighboring pixels of $p(i', j')$ in image $I_{t-1}$, leading to a 2D graph that is neither a 1D chain nor a tree-structured graph. As a result, the inference would become NP-hard.

Therefore, we use homography to impose smoothness across images and still maintain the 1D graph during inference. Instead of using smoothness across nearby pixels, we determine a homography matrix based on the ground plane. This gives us one-to-one mapping from a pixel on the ground in one image to its corresponding pixel on the ground in the previous image. This also provides a mapping between the free space curve in one image to another. Let $H(t,t-1)$ be the homography matrix that maps a pixel location at $(i, j)$ in image $I_t$ to a pixel at location $(i', j')$ in image $I_{t-1}$, as given by:

$$\begin{pmatrix} i' \\ j' \\ 1 \end{pmatrix} = H(t, t-1) \begin{pmatrix} i \\ j \\ 1 \end{pmatrix}. \quad (7)$$

In this way, the potential can be written as $$\phi_{homography}(y_i = j) = \phi_u(y_i = j'), \quad (8)$$

where $u \in U \backslash homography$, and $\phi_u(y_i = j')$ is the unary potential in the previous image $I_{t-1}$.

The different unary potentials in image $I_{t-1}$ map to homography potentials in $I_t$. We determine the homographies using scale-invariant feature transform (SIFT) in a RANdom SAmple Consensus (RANSAC) framework. In the case of water, we detect correspondences only near the previous free space curve because there are too many spurious correspondences on the water. Note that the edges from reflections of objects on water will not match using the homography matrix, and thus we can filter the reflections from our curve. In the case of road scenes, we use the SIFT matches below the previous free space curve to determine the homography matrix, as reflections are not a problem.

Smoothness

We employ a truncated quadratic penalty to encourage the curve to be smooth. Note that this curve is non-smooth only when there are obstacles, which happens only at a few columns. Thus $$\phi_p = \begin{cases} \exp(-\alpha(y_i - y_j)^2) & \text{if } |y_i - y_j| \leq T \\ \lambda_d & \text{otherwise} \end{cases}, \quad (9)$$

where $\alpha$, $\lambda_d$, and $T$ are constants.

Inference

The MAP estimate, or maximum energy configuration, can be determined by solving $$\max w^T \phi(y, i_t, I_{t-1}). \quad (10)$$

Our graph forms a 1D chain, and thus exact inference can be done using dynamic programing, with a complexity of $O(wn^2)$, where w is the width of the image and n is the number of labels for each variable after imposing the horizon constraint.

The weight parameters w can be manually set, or automatically determined using the training images 250 as described below.

Parameter Learning

We use the structured SVM to learn the weight parameters using the training images:

$$\min \frac{1}{2} \|w\|^2 + C \sum_i \xi_i \quad (11)$$

-continued $$\text{s.t. } \xi_i \geq w^T \ (\phi_i(y) - \phi_i(y^{(i)})) + \Delta(y, y^{(i)}), \forall .$$

$$\xi_i \geq 0, \forall \ i = 1, \ldots, N.$$

Here, $y^{(t)}$ is the ground-truth curve for the i-th instance, $\Delta(y,y^{(i)})$ the loss function, and N the total number of training examples. The loss function is a truncated version of the relative gap as shown below:

$$\Delta(y_i, y) = \begin{cases} |y - y_i| & \text{if } |y - y_i| \leq T \\ T & \text{if } |y - y_i| > T \end{cases}, \quad (12)$$

where T is a constant. We use a cutting plane procedure, where at each iteration we solve the following loss augmented inference to determine the most violated constraint:

$$\forall i, \max w^T(\phi_i(y) - \phi_i(y^{(i)})) + \Delta(y, y^{(i)}). \quad (13)$$

As the loss decomposes into unary potentials, the loss-augmented inference can be solved exactly via dynamic programming.

Our method can also incorporate other features by defining a unary potential for each additional feature, and adding the potential to the set of unary potentials in Eq. (3). The weight parameters for the other features can be manually set or automatically determined by the learning method formulated in Eq. (11). Other features include optical flow and depth maps determined from the monocular video. If stereo or multiple cameras are available, features obtained from stereo or multi-camera cues can also be incorporated, such as depth maps determined from the multiple cameras. Note that any number and combination of features can be used in our method by changing the set of unary potentials in Eq. (3) accordingly.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating free space near a moving object, comprising:
   acquiring a sequence of images of a scene by a monocular camera system arranged on the moving object, and for each image in the sequence of images:
      constructing a Markov random field as a one-dimensional graph, wherein each node in the graph corresponds to a discrete variable for a column of pixels in the image;
      determining features in the image;
      constructing an energy function on the one-dimensional graph based on the determined features; and
      using dynamic programming to maximize the energy function to obtain a curve, wherein an area under the curve defines the free space near the object, wherein the free space is used for autonomous navigation of the moving object moving from one location to another, and wherein the steps are performed in a processor connected to the monocular camera system, wherein the energy function comprises a sum of unary and pairwise potential functions, and wherein each potential function is determined using a corresponding feature among the determined features and a corresponding weight parameter learned from a sequence of training images.

2. The method of claim 1, wherein the moving object is a vehicle and the scene includes a road.

3. The method of claim 1, wherein the moving object is a boat and the scene includes water.

4. The method of claim 1, further comprising:
   estimating, for each column of pixels in the image, vertical coordinates of an obstacle.

5. The method of claim 1, wherein the free space is in front of or behind the moving object.

6. The method of claim 4, further comprising:
   using an estimate of a horizon to restrict the vertical coordinates of the obstacle.

7. The method of claim 6, wherein the estimate of the horizon is determined based on a configuration of the camera system.

8. The method of claim 6, wherein the estimate of the horizon is determined using a set of training images.

9. The method of claim 1, wherein the weight parameter is set manually.

10. The method of claim 1, wherein the weight parameter is determined automatically from a set of training images using a structured support vector machine.

11. The method of claim 1, wherein the features are selected from a group consisting of edges, appearance, homography, geometric context, smoothness, optical flow, a depth map and combinations thereof.

12. The method of claim 11, wherein the appearance is modeled by Gaussian mixture models.

13. The method of claim 1, further comprising:
    determining a location prior probability for each pixel in the image to smooth the curve.

14. The method of claim 11, wherein the homography imposes smoothness across the images, wherien the homography is based on a ground plane in the image.

15. The method of claim 1, wherein a truncated quadratic penalty is used to smooth the curve.

16. The method of claim 1, wherein the moving object is a vehicle, and wherein the free space is used for autonomous navigation of the vehicle moving from one location to another.

17. The method of claim 1, wherein the moving object is a boat, and wherein the free space is used for manouvering the boat during berthing or mooring .

18. The method of claim 1, wherein the moving object is a vehicle, and wherein the free space is used for parking assistance for the vehicle.

19. The method of claim 1, wherein the moving object is a an indoor mobile robot, and wherein the free space is used by the indoor mobile robot for moving inside a building.

20. The method of claim 1, wherein the moving object is a vacuum cleaning robot, and wherein the free space is used by the vacuum cleaning robot.

21. A system for estimating free space near a moving object comprising:
    a monocular camera system arranged on the moving objects for acquiring a sequence of images of a scene; and
    a processor connected to the monocular camera system being operable to:
       construct a Markov random field as a one-dimensional graph, wherein each node in the graph corresponds to a discrete variable for a column of pixels in the image,
       determine features in the image,
       construct an energy function on the one-dimensional graph based on the determined features; and use dynamic programming to maximize the energy function to obtain a curve, wherein an area under the curve defines the free space near the object, wherein the free space is used for autonomous navigation of the moving object moving from one location to another, wherein the energy function comprises a sum of unary and pairwise potential functions, and wherein each potential function is determined using a corresponding feature among the determined features and a corresponding weight parameter learned from a sequence of training images.

* * * * *